United States Patent [19]

Carruthers

[11] 4,446,601
[45] May 8, 1984

[54] SQUID CLEANING METHOD AND APPARATUS

[75] Inventor: Eben H. Carruthers, Warrenton, Oreg.

[73] Assignee: Carruthers Equipment Co., Warrenton, Oreg.

[21] Appl. No.: 410,411

[22] Filed: Aug. 23, 1982

[51] Int. Cl.³ ............................................. A22C 25/14
[52] U.S. Cl. ........................................... 17/51; 17/46; 17/53; 17/64
[58] Field of Search ................... 17/1 G, 53, 64, 65, 17/21, 46, 51

[56] References Cited

U.S. PATENT DOCUMENTS

| 671,421 | 4/1901 | Merkle | 17/64 |
| 1,853,328 | 4/1932 | Youman | 17/58 |
| 2,128,607 | 8/1938 | Godfrey | 17/64 |
| 2,817,862 | 12/1957 | Frazho et al. | 17/1 G X |
| 2,951,490 | 9/1960 | Cuillier | |
| 3,789,457 | 2/1974 | Snow | 17/53 X |
| 4,285,099 | 8/1981 | Singh et al. | 17/53 |

FOREIGN PATENT DOCUMENTS

| 422969 | 9/1974 | U.S.S.R. |
| 584834 | 12/1977 | U.S.S.R. |
| 596205 | 2/1978 | U.S.S.R. |

OTHER PUBLICATIONS

"Automatic Squid Cleaning Machine;" Singh et al., *California Agriculture*, Jul.-Aug. 1981, pp. 4-6.

"Properties of Squid . . . ", ASAE, vol. 22, No. 3, pp. 658-663, 1979.
"Squid", *Seafood America*, Ares, Sep. 1981, pp. 127-337.
"Squid, The Untapped Seafood", *Food Engineering*, No date.
"A Machine to Eviscerate & Skin Squid", Brown et al., *Transactions of the ASAE*, vol. 24, No. 1, pp. 259-264, 1981.
"Development of a Squid Skinning & Eviscerating System", Singh et al., *Marine Fisheries Review*, Jul.-Aug. 1980, pp. 70-84.

*Primary Examiner*—Willie G. Abercrombie
*Attorney, Agent, or Firm*—Kolisch, Hartwell, Dickinson & Anderson

[57] ABSTRACT

A method and apparatus for cleaning squid bodies which have been separated from the heads and tentacles, employing upstream and downstream, partially overlapping, facially confronting, perforate conveyor belts, through the perforations in which a vacuum apparatus is employed to hold such bodies tightly against the belts. On the upstream belt, successive bodies are slit along one side to fillet them, thus to enable them to lay out flat on the belt, with mechanical and hydraulic scrubbing action then employed to clean one side of each body. Where the two belts overlap, a transfer action takes place, with the successive bodies there transferred to, and then held against, the other belt to expose the opposite sides of the bodies for mechanical and hydraulic scrubbing action.

10 Claims, 3 Drawing Figures

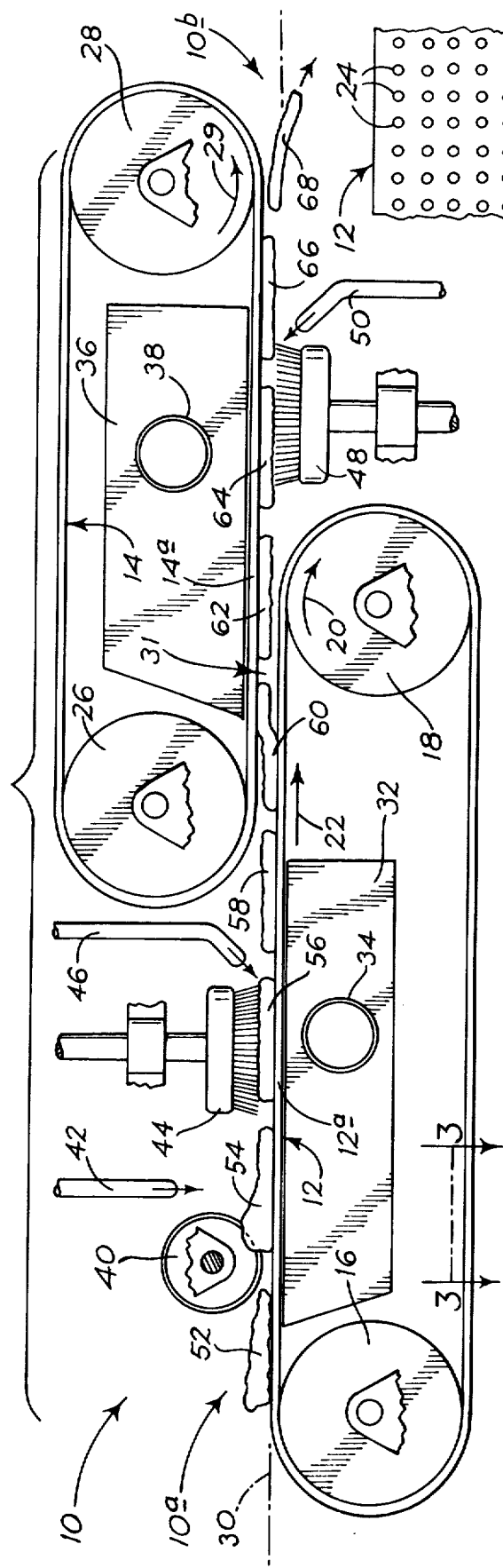
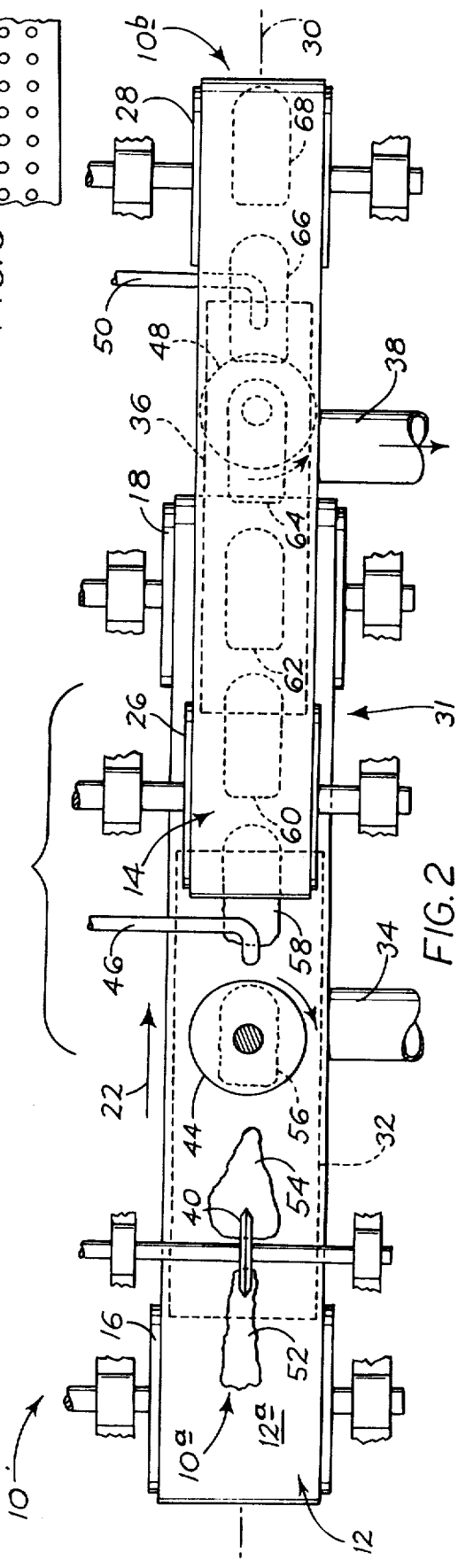

SQUID CLEANING METHOD AND APPARATUS

BACKGROUND AND SUMMARY OF THE INVENTION

This invention pertains to a method and apparatus for cleaning squid bodies, and particularly for cleaning such bodies which have, in any suitable fashion, been separated from the heads and tentacles.

As is known by many people involved at various levels in the food and nutrition industries, squid represents an extremely low-cost, high-nutritional-value seafood. There is, however, a barrier to the mass introduction of squid into the marketplace, resulting from the equally well-known difficulty of attaining high-speed economical cleaning. Taking, generally speaking, an overview of the required cleaning process, it involves the removal of the head, eyes, skin, viscera and backbone from the mantle, to leave a white flesh cone which can then be split into a fillet for ultimate cleaning, packaging and consumption. Removal of the head with tentacles, etc., from a squid body is a relatively easy thing to accomplish quickly and economically, but it is the other steps required to result in the final cleaned fillet that present the major roadblocks.

Accordingly, a general object of the present invention is to provide a unique method and apparatus for the cleaning of squid bodies from which, in any suitable manner, the heads and tentacles, and immediately associated anatomy, have been severed.

More particularly, an object of the invention is to provide such a method and apparatus which produces high-speed, low-cost automated cleaning.

Still another object of the invention is to provide a method and apparatus of the type generally outlined which employs relatively simple, reliable, low-maintenance apparatus which can easily be incorporated in conventional seafood processing installations, whether such installations be land-based or ship-based.

According to a preferred embodiment of the apparatus of the invention, the same employs two endless, perforate conveyor belts, power driven—one being referred to as an upstream conveyor belt, and the other being referred to as a downstream conveyor belt. Runs in these belts partially overlap and confront one another facially to define, collectively, a transport path through the apparatus for the conveying of successive squid bodies. While in all instances this need not be the case, in the apparatus shown and described herein, these "working" runs of the belts lie in closely vertically spaced horizontal planes.

The working run of the upstream belt receives successive squid bodies on its upper surface, with a vacuum drawn through its perforations to hold the bodies securely against the run. As successive bodies travel in a downstream direction on this run, they are first slit to fillet them, and are thereafter subjected to a combined mechanical and hydraulic scrubbing action furnished by a rotary brush, and by high-pressure sprays of water. As the filleted and one-side-cleaned bodies pass downstream from the scrubbing mechanism, they come into confronting relationship with the lower face of the working run in the downstream belt. At a point downstream from where the vacuumizing structure associated with the upstream conveyor belt ends, apparatus is provided to draw a vacuum through the perforations in the lower run of the downstream belt, to effect a transfer of successive squid bodies to the lower fact of the lower run. At a location downstream from the downstream end of the upstream conveyor belt, the opposite undersides of the bodies are subjected to the same kind of combined mechanical and hydraulic scrubbing action discussed in conjunction with the upstream belt. Thereafter, the cleaned bodies are discharged from the off-bearing end of the downstream conveyor belt.

Various other objects and advantages which are attained by the method and apparatus of the invention will become more fully apparent as the description which now follows is read in conjunction with the accompanying drawings.

DESCRIPTION OF THE DRAWINGS

FIG. 1 is a simplified, fragmentary side elevation illustrating apparatus constructed in accordance with the invention for cleaning squid bodies.

FIG. 2 is a plan view taken from the top side of FIG. 1.

FIG. 3 is a fragmentary view taken generally along the line 3—3 in FIG. 1, showing a portion of the lower run in a perforate endless conveyor belt used in what is referred to herein as the upstream conveyor in the apparatus of FIG. 1.

DETAILED DESCRIPTION OF THE INVENTION

Turning now to the drawings, and referring initially to FIGS. 1 and 2, indicated generally at 10 is an apparatus constructed in accordance with the invention for cleaning squid bodies. As viewed in these two figures, the apparatus includes intake and discharge end zones 10a, 10b, respectively, at the left and right sides, respectively, in the figures. It should be understood that all of the apparatus which is shown in these two figures is suitably mounted on a common frame, but that the frame has been omitted in the figures for the purpose of drawing simplification. Obvious brackets have been added in the two figures to indicate an integrated environment for the apparatus.

Included in apparatus 10 are two endless perforate conveyor belts 12, 14, referred to herein respectively as upstream and downstream belts, and collectively as a conveyor means. These two belts are formed of a low-maintenance, easy-to-sanitize material, such as a suitable plastic material.

Belt 12 is trained, as shown, over an idler 16 and a power-driven roll 18 which is rotated under power in the direction of arrow 20 (see FIG. 1). The upper run, 12a, in belt 12, resides in a substantially horizontal plane in apparatus 10, and with drum 20 rotating, travels in a downstream direction, indicated by an arrow 22, at a speed of about 47-feet-per-minute. The upper surface of run 12a has a length in apparatus 10 of about 39-inches. Also, it has a width, measured in a direction which is normal to the plane of FIG. 1, of about 8-inches.

Perforations in belt 12 are shown at 24 in FIG. 3, which figure depicts a fragment of the lower run in the belt. In apparatus 10 these perforations each has a diameter of about ¼-inches, with the perforations distributed in a rectangular grid pattern having center-to-center spacings of about ⅜-inches.

Conveyor belt 14 is similar in construction to belt 12, and is trained over an idler 26 and a power-driven roll 28 which is driven in the direction of arrow 29. The lower run, 14a, in belt 14 lies in a horizontal plane, has an overall length herein of about 39-inches, and travels in the direction of arrow 22 at substantially the same speed as run 12a.

As can be seen both in FIGS. 1 and 2, runs 12a, 14a longitudinally overlap one another, and as is apparent in FIG. 1, are vertically spaced, with the lower face of run 14a being disposed above the upper face of run 12a by about ½-inches.

Runs 12a, 14a collectively define what is referred to herein as a transport path 30 which extends longitudinally through apparatus 10 between its intake and discharge end zones. Also, the region, 31, where these two runs confront and overlap one another is referred to herein as a transfer zone.

Disposed as shown, closely adjacent a major portion of the length of the underside of run 12a, is a plenum 32 which connects through a conduit 34 with a conventional vacuum apparatus (not shown). A similar plenum 36, connected to the same vacuum apparatus through a conduit 38, overlies, in close adjacency, a major portion of the length of the upper side of run 14a. Plenums 32, 36 each constitutes herein a low-pressure-creating means.

Provided immediately over belt run 12a, where the same extends over plenum 32, and progressing in a downstream direction along run 12a, are a power-driven, rotary, disc-like slitting knife, or slitting means, 40, a water-jet nozzle 42 (FIG. 1), a rotary scrubbing brush 44, and another water-jet nozzle 46. Knife 40 rotates in a vertical plane substantially centered over the upper run in belt 12 as shown. Brush 44 rotates under power in a horizontal plane. Nozzles 42, 46 and brush 44 collectively constitute a first scrubber means, with nozzles 42, 46 together being referred to as hydraulic scrubbing structure, and with brush 44 being referred to as mechanical scrubbing structure.

Completing a description of what is shown in the drawings, disposed downstream from belt 12, adjacent the underside of run 14a, and progressing in a downstream direction along this run, are a rotary scrubbing brush 48 and a water-jet nozzle 50. Devices 48, 50 are referred to collectively as a second scrubber means, with brush 48 alone being referred to as mechanical scrubbing structure, and nozzle 50 alone being referred to as hydraulic scrubbing structure. As is true in the case of brush 44, brush 48 rotates under power in a horizontal plane.

To aid now in an explanation of how apparatus 10 performs, nine squid bodies 52, 54, 56, 58, 60, 62, 64, 66, 68 are shown distributed at different locations along transport path 30. Successive squid bodies, such as the ones just mentioned, are fed one after another in any suitable manner centrally onto the upstream end of conveyor run 12a. Preferably, the bodies are fed endo, with their tails downstream, and with the heads and tentacles (and associated anatomy) suitably removed as a consequence of a prior processing step. Progressing from the point where these bodies are first introduced to the apparatus, they pass beneath knife 40 which is positioned so as to slit the upper sides of the bodies, thus to fillet the same, and to enable them to lay out flat on run 12a. In FIGS. 1 and 2, body 52 is just engaging knife 40, and body 54 is just passing beyond the knife and beneath nozzle 42. With plenum 32 disposed as shown, as soon as the bodies begin to travel over the plenum, they are held by vacuum downwardly against the upper surface of run 12a.

The thus filleted bodies are now subjected to a scrubbing action, beginning with hydraulic scrubbing under the influence of nozzle 42, followed by mechanical scrubbing under the influence of brush 44, and finally hydraulic scrubbing under the influence of nozzle 46. Body 56 in FIGS. 1 and 2 is shown being engaged by brush 44, and body 58 is shown passing downstream from nozzle 46. At this stage, the upper surface of a body has been cleaned.

As a body continues downstream, it passes beyond the gripping influence of plenum 32, as it enters transfer zone 31, and shortly thereafter is lifted onto the underside of belt run 12a through the action of plenum 36. Squid body 60 is shown in a condition being transferred from run 12a to run 14a, and body 62 is shown in a condition fully transferred as it begins to pass downstream beyond belt 12.

The undersides of successive bodies now held against the underside of belt run 14a are subjected to scrubbing action, first mechanically by brush 48, and thereafter hydraulically by jet 50. In FIGS. 1 and 2, body 64 is shown in a condition being engaged in by brush 48, and body 60 in a condition just passing beyond the influence of nozzle 50.

At this point in the operation, the underside of each squid body is now also cleaned, and the body is ready for discharge. Squid body 68 in FIGS. 1 and 2 is in such a condition, and is shown being discharged from the off-bearing end of belt run 14a. Such discharged bodies are then transported in any suitable manner for subsequent handling. With the conveyor belts traveling at the speed indicated above, apparatus 10 is capable of handling about 120-squid per-minute.

The method of the invention can thus be seen to include the following steps:

1. Creating an upstream, positive-advancement travel run, and transporting successive bodies along such run. This is accomplished through the cooperative actions of belt run 12a and vacuum plenum 32.

2. Slitting each body to fillet it, thus to enable it to lay out flat. This is done through the action of knife 40.

3. Scrubbing one of the body's surfaces (its upper surface) to clean it—such being done under the influences of nozzles 42, 46 and brush 44.

4. Creating a downstream, positive-advancement travel run to effect body transport—such being done under the influences of run 14a and vacuum plenum 36.

5. Scrubbing the opposite surface of the body to clean the same—this being done by brush 48 and nozzle 50.

From the foregoing, it should be clear how all of the objects and advantages ascribed to the invention are accomplished. The apparatus proposed according to the invention, plainly, is simple, inexpensive, and easy to maintain. The apparatus and the method steps which the same performs, promote a high-speed, automated cleaning operation.

While a preferred embodiment of the invention has been herein described, it will be apparent to those skilled in the art that various changes and modifications may be made without departing from the spirit of the invention.

It is claimed and desired to secure by letters patent:

1. Automatic squid-cleaning apparatus comprising
elongate conveyor means defining a transport path for the travel of squid fed in succession through said apparatus, said conveyor means extending between intake and discharge end zones in said apparatus, means disposed toward, but somewhat downstream from, said intake zone for slitting a side of the bodies of squid received by said conveyor means adjacent said intake zone to enable substantial flattening-out of such bodies relative to the conveyor means, first scrubber means disposed adjacent said conveyor means downstream from said slitting means for cleaning, by scrubbing action, one side of such flattened-out squid bodies as the same travel along said path, and second scrubber means disposed adjacent said conveyor means downstream from said first scrubber means, and somewhat upstream from said discharge end zone, for cleaning, by scrubbing action, the opposite sides of such flattened-out squid bodies as the same continue to travel along said path.

2. The apparatus of claim 1, wherein said conveyor means includes upstream and downstream, perforate, endless conveyor belts, with each having an elongated run substantially coextensive with said path, and partially overlapping and confronting the corresponding run in the other belt to define at least a portion of said path, and which further includes, for each run, low-pressure-creating means communicating with perforations in the run, on the non-path-defining side thereof at least along an extent in the run non-overlapping with the other run.

3. The apparatus of claim 1, wherein said first and second scrubbing means each includes hydraulic scrubbing structure.

4. The apparatus of claim 3, wherein said first and second scrubbing means each further includes mechanical scrubbing structure.

5. The apparatus of claim 2, wherein said low-pressure-creating means are designed relative to one another in such a manner as to cause at least a portion of the region of overlap between the two runs to function as a transfer zone for the transfer of a squid body from low-pressure adherence to said run in said upstream belt to the same condition with respect to said run in said downstream belt.

6. The apparatus of claim 5, wherein said first and second scrubbing means each includes hydraulic scrubbing structure.

7. The apparatus of claim 6, wherein said first and second scrubbing means each further includes mechanical scrubbing structure.

8. The apparatus of claim 5, wherein said upstream conveyor belt has a substantially planar horizontal upper face at least partially defining the lower side of said path, and said downstream conveyor belt has a substantially planar horizontal lower face at least partially defining the upper side of said path.

9. A method for the automatic cleaning of squid bodies which have been separated from their heads and tentacles comprising creating an upstream, positive-advancement travel run for such a body, and transporting the body in a downstream direction along such run, while so transporting the body, first, slitting the same along the length of one side to fillet the body, and thereafter, scrubbing the surface of the body which becomes exposed as a result of said slitting, creating a downstream, positive-advancement travel run which is coextensive with the downstream end of the upstream run, and transferring the body from the upstream run to the downstream run to effect continued downstream transport of the body with the body surface therein which is opposite the first-mentioned body surface now exposed, and while so continuing the downstream transport of the body, scrubbing such opposite surface.

10. The method of claim 9, wherein said two creatings are accomplished through producing low-pressure, adherence, transport zones adjacent surfaces in upstream and downstream runs in perforate conveyor belts.

* * * * *